(12) United States Patent
Eisfelder et al.

(10) Patent No.: US 8,910,739 B2
(45) Date of Patent: Dec. 16, 2014

(54) PRESSURE CONTROL DEVICE AND METHOD FOR A VEHICLE

(75) Inventors: Stefan Eisfelder, Seelze (DE); Ingo Stumberg, Hannover (DE); Christian Wiehen, Burgwedel (DE); Christoph Wilken, Salzbergen (DE)

(73) Assignee: WABCO GmbH, Hannover (DE)

( * ) Notice: Subject to any disclaimer, the term of this patent is extended or adjusted under 35 U.S.C. 154(b) by 92 days.

(21) Appl. No.: 13/582,197

(22) PCT Filed: Mar. 7, 2011

(86) PCT No.: PCT/EP2011/001111
§ 371 (c)(1),
(2), (4) Date: Aug. 31, 2012

(87) PCT Pub. No.: WO2011/144271
PCT Pub. Date: Nov. 24, 2011

(65) Prior Publication Data
US 2013/0004339 A1    Jan. 3, 2013

(30) Foreign Application Priority Data

May 15, 2010  (DE) .................. 10 2010 020 672
Aug. 5, 2010  (DE) .................. 10 2010 033 539

(51) Int. Cl.
*B60K 3/02*  (2006.01)
*B60T 1/10*  (2006.01)
*B60K 6/12*  (2006.01)
*B60T 17/02*  (2006.01)

(52) U.S. Cl.
CPC ... *B60T 1/10* (2013.01); *B60K 6/12* (2013.01); *B60T 17/02* (2013.01); *Y02T 10/6208* (2013.01)
USPC .......................................... 180/302; 180/165

(58) Field of Classification Search
CPC .................................. B60K 3/02; B60K 6/12
USPC .................................. 180/165, 302
See application file for complete search history.

(56) References Cited

U.S. PATENT DOCUMENTS 3,765,180 A * 10/1973 Brown ........................... 60/370
3,913,699 A * 10/1975 Dyer ............................. 180/302
4,361,204 A * 11/1982 Earle ............................ 180/302

(Continued)

FOREIGN PATENT DOCUMENTS

DE          1 139 699         11/1962
DE       196 00 910 A1         6/1996
DE    10 2005 039 281 A1       2/2007
DE    10 2007 033 693 A1       1/2009

*Primary Examiner* — Jeffrey J Restifo
(74) *Attorney, Agent, or Firm* — Kramer Levin Naftalis & Frankel LLP

(57) ABSTRACT

A pressure control device for a vehicle comprises an electronic control unit and a valve device for controllably connecting a compression chamber of the vehicle's air compressor to the vehicle's compressed-air supply and storage system. The pressure control device is configured to (i) connect the compression chamber to the compressed-air supply and storage system in a compressed-air production mode to convey compressed air from the compression chamber into the compressed-air supply and storage system, (ii) connect the compression chamber to the compressed-air supply and storage system in a compressed-air expansion mode to convey compressed air from the compressed-air supply and storage system into the compression chamber, and (iii) switch from the compressed-air production mode to the compressed-air expansion mode and vice-versa by electrically actuating one or more electrically operable valves of the valve device.

27 Claims, 9 Drawing Sheets

(56) References Cited

U.S. PATENT DOCUMENTS

| | | | |
|---|---|---|---|
| 4,478,304 A * | 10/1984 | Delano | 180/165 |
| 4,596,119 A * | 6/1986 | Johnson | 60/407 |
| 6,223,846 B1 * | 5/2001 | Schechter | 180/165 |
| 6,363,723 B1 * | 4/2002 | Negre et al. | 60/712 |
| 6,629,573 B1 * | 10/2003 | Perry | 180/54.1 |
| 7,464,675 B1 * | 12/2008 | Schechter | 123/90.15 |
| 7,543,668 B1 * | 6/2009 | Schechter | 180/165 |
| 7,607,503 B1 * | 10/2009 | Schechter | 180/165 |
| 7,789,181 B1 * | 9/2010 | Schechter | 180/165 |
| 8,079,437 B2 * | 12/2011 | Rosman | 180/165 |
| 8,087,487 B2 * | 1/2012 | Mustafa | 180/302 |
| 8,177,016 B2 * | 5/2012 | Tai | 180/302 |
| 8,240,416 B2 * | 8/2012 | Cong | 180/165 |
| 8,403,091 B2 * | 3/2013 | Prakash et al. | 180/165 |
| 8,459,391 B2 * | 6/2013 | Brookman et al. | 180/165 |
| 8,517,137 B2 * | 8/2013 | Tai | 180/302 |
| 8,567,544 B2 * | 10/2013 | Rosman | 180/165 |
| 8,584,644 B2 * | 11/2013 | Ma et al. | 123/179.3 |
| 8,727,064 B2 * | 5/2014 | Tai | 180/302 |
| 2006/0225941 A1 * | 10/2006 | Cole | 180/302 |
| 2007/0215396 A1 * | 9/2007 | Rask et al. | 180/65.3 |
| 2007/0278024 A1 * | 12/2007 | Liu | 180/69.5 |
| 2010/0086414 A1 * | 4/2010 | Tai | 417/34 |
| 2010/0095661 A1 * | 4/2010 | Hemphill et al. | 60/327 |
| 2010/0116578 A1 * | 5/2010 | Mustafa | 180/165 |
| 2010/0139266 A1 | 6/2010 | Gerum | |
| 2010/0307849 A1 * | 12/2010 | Li | 180/165 |
| 2013/0096800 A1 * | 4/2013 | Tai | 701/100 |
| 2013/0333969 A1 * | 12/2013 | Dieckmann et al. | 180/165 |
| 2014/0130485 A1 * | 5/2014 | Huff | 60/327 |

\* cited by examiner

PRESSURE CONTROL DEVICE AND METHOD FOR A VEHICLE

FIELD OF THE INVENTION

The present invention generally relates to a pressure control device and method for a vehicle.

BACKGROUND OF THE INVENTION

In the sector of utility vehicles, that is, motor trucks and omnibuses, it is customary to use compressed air braking installations. Vehicles of this type therefore have elements for generating compressed air and for storage, such as, for example, a compressor and a reservoir. The compressor is usually driven by the vehicle engine—permanent and sometimes also releasable couplings, for example via a controllable clutch, being provided between the compressor and the engine.

The proposal to use a compressor as an additional drive unit of a vehicle is disclosed in DE 10 2005 039 281 A1. In this case, it is proposed to operate the existing valves of a compressor, to be precise a high-pressure valve and a low-pressure valve, mechanically via a cam mechanism. In order to change over between the compressor mode and engine mode as operating modes, it is proposed to use a cam phaser, which is known from engine technology. A similar proposal is also disclosed in DE 10 2007 033 693 A1.

However, the use of a cam mechanism with a cam phaser is relatively complicated and costly in mechanical and structural terms. Also, this necessitates a reconstruction of the cylinder head of the compressor.

SUMMARY OF THE INVENTION

Generally speaking, it is an object of the present invention to provide a simplified and cost-effective implementation for operating a compressed air compressor—both for generating compressed air and as an additional drive for the vehicle.

The invention is based on the idea of utilizing the compressed air compressor usually present in a utility vehicle for assisting the vehicle engine. Thus, the compressed air compressor can be operated as a pneumatic engine to assist an acceleration action of the vehicle or when the vehicle is driving uphill, in that compressed air is conveyed out of a compressed air reservoir of the vehicle back into the compressor, specifically in synchronism with the movement of the compressor, such that the engine undergoes an assisting torque. As a result, in a similar way to a hybrid electric drive of a passenger car, the vehicle engine usually designed as an internal combustion engine can have a lower nominal power rating. A smaller, lighter and more cost-effective engine can therefore be used. This operating mode is also designated as a compressed air expansion mode.

Correspondingly, in a compressed air generation mode, compressed air compressed by the compressor is conducted from a compression space of the compressed air compressor into the compressed air supply and storage installation and, in the compressed air expansion mode, compressed air is conducted from the compressed air supply and storage installation into the compression space where the compressed air is expanded to assist the drive of the vehicle.

In a medium-weight utility vehicle, which nowadays is a conventional vehicle type, when a commercially available compressed air compressor is used, for example, an additional average drive torque of approximately 50 Nm can be expected by virtue of the invention, this being a considerable value, as compared with a drive torque of a diesel engine of about 700 Nm.

According to an embodiment of the present invention, a pressure control device is configured to change over from the compressed air generation mode into the compressed air expansion mode, and vice-versa, as a result of the electrical actuation of one or more electrically actuatable valves of a valve assembly by means of an electronic control apparatus. For this purpose, the electronic control apparatus may be provided with corresponding programming for actuating the electrically actuatable valves when a changeover demand is recognized. It is therefore advantageous that no complicated mechanical structures, such as a cam phaser, are required for changing over from the compressed air generation mode into the compressed air expansion mode and back again. Instead, electrically actuatable valves, which are actuated by the electronic control apparatus, can be provided for this purpose. The advantage of this is that the inventive embodiments can be implemented with existing commercially available compressed air compressors, either only simple, cost-effective modifications or no modifications at all being required on the compressed air compressors, depending on the configuration and arrangement of the electrically actuatable valves. In the latter case, the electrically actuatable valves may precede or follow the compressed air compressor.

Insofar as reference is made herein to crankshaft-dependent control, this embraces mechanical crankshaft-dependent control, for example via a camshaft, and any other type of crankshaft-dependent control, for example electrical control in which, for example, the crankshaft position is detected via a crankshaft sensor and control is carried out to some extent in a crankshaft-dependent way as a function of the sensor signal, for example the actuation of electrically actuatable valves.

Insofar as mechanical crankshaft-dependent control is referred to, this covers, for example, control via a camshaft, in which case cam actuation may be implemented, for example, via mechanical tappets or hydraulic tappets.

What is included, furthermore, is electrohydraulic actuation such that the electrically actuatable valves used are hydraulic valves, which, as a result of electrical actuation, allow a throughflow, shut-off or change of the flow of a hydraulic medium.

In embodiments in which mechanical crankshaft-dependent control is not provided, but purely electrically actuatable valves are used, crankshaft-dependent control takes place as a result of the correspondingly clocked actuation of these valves. In this case, a changeover between the compressed air generation mode and the compressed air expansion mode can be carried out by means of a change in the activation signals, that is, for example, a change in the clocking of these valves. For this purpose, a control program of the electronic control apparatus stores the type of actuation of electrical valves, which is necessary in the respective operating mode.

The possibilities explained in more detail hereinafter for implementing the invention by means of the electrically actuatable valves may be classified technically as follows. In this case, a compressed air compressor is assumed which, as is customary, for example, in piston compressors, has an inlet valve (also called an intake valve or low-pressure valve) and an outlet valve (also called an expulsion valve or high-pressure valve) for the compressed air generation mode. To distinguish this from the compressed air expansion mode, these valves may also be designated as a compression inlet valve and a compression outlet valve.

1. The compressed air compressor remains unchanged:

An inlet connection, leading to the compression inlet valve, of the compressed air compressor is preceded by an electrically actuatable valve; an outlet connection, leading to the compression outlet valve, of the compressed air compressor is followed by a further electrically actuatable valve.

2. The compressed air compressor is modified, the compression inlet valve and the compression outlet valve remaining unchanged:

An additional connection or tap is provided in the cylinder head of the compressed air compressor such that an electrically actuatable valve can be connected to the compression space via the additional connection. The connectable electrically actuatable valve can be formed from discrete individual valves for a compressed air inlet function in the compressed air expansion mode (expansion inlet valve) and for the compressed air outlet function in the compressed air expansion mode (expansion outlet valve) or else as a combined expansion inlet/outlet valve, for example in the manner of a 3/2-way valve. The expansion inlet and outlet valves may also have, in addition to electrical actuation, crankshaft-dependent mechanical actuation, for example via a camshaft.

3. The compressed air compressor is also modified in terms of the compression inlet valve and/or of the compression outlet valve:

a) The compression inlet valve and the compression outlet valve of the compressed air compressor are replaced by electrically controllable inlet and outlet valves, by means of which both the compressed air generation mode and the compressed air expansion mode are implemented by electronic control.

b) Mechanically crankshaft-controlled inlet valves and outlet valves are provided, which can be locked in an open or closed position by electrical actuation. Both the compressed air generation mode and the compressed air expansion mode are implemented by means of the mechanically crankshaft-controlled inlet valves and outlet valves.

c) The compressed air compressor is provided with additional mechanically crankshaft-controlled expansion inlet and expansion outlet valves, which can then be connected to the compressed air reservoir or to the atmosphere via electrically actuatable valves.

It is also advantageous that combinations of the abovementioned embodiments can be implemented. Thus, in the abovementioned embodiments a) to c), for example, the compression inlet valve of the compressed air compressor may also be kept unchanged. An additional crankshaft-controlled expansion outlet valve is then added, which can be connected to the atmosphere via an electrically actuatable valve. In addition, the existing compression outlet valve of the compressed air compressor may be preserved, but may be additionally controlled in a crankshaft-dependent way.

Advantageously, a pressure control device detects, for example by means of an electronic control apparatus, whether there is increased demand for drive power when the vehicle is in operation, for example when the vehicle is to be accelerated or when it is driving uphill. In this case, the pressure control device ensures that the compressed air compressor is operated in a compressed air expansion mode. In the compressed air expansion mode, the engine is assisted by compressed air from the compressed air supply and storage installation by the compressed air compressor being acted upon with compressed air. Advantageously, also, the pressure control device detects overrun phases when the vehicle is in operation. An overrun phase is detected, for example, when the driver wants to decelerate the vehicle or when driving downhill. When an overrun phase is present, by means of the pressure control device, the compressed air compressor is automatically operated in a compressed air generation mode in which the compressed air compressor conveys compressed air into the compressed air supply and storage installation. Thus, during overrun phases when the vehicle is in operation, the bleeding of compressed air from the compressed air supply and storage installation, which was carried out during the phases of increased drive power demand, can be compensated for. It is thereby possible for the vehicle to be operated in an especially energy-saving way.

The compressed air compressor may additionally be switched by the pressure control device into an idling mode in which compressed air is neither generated nor consumed in the compressed air expansion mode. The idling mode is provided as a third operating mode in addition to the compressed air generation mode and to the compressed air expansion mode. It is known, for example, to use a connectable dead space in the case of a single-cylinder compressed air compressor, to connect the pressure spaces in the case of a multicylinder compressed air compressor or to uncouple the compressed air compressor from the engine by means of a shiftable clutch.

According to an embodiment of the invention, the pressure control device is designed, when a compressed air compressor separable from the vehicle engine via a shift clutch is used, for connecting this compressed air compressor automatically to the engine when the compressed air compressor is operated in the compressed air generation mode or in the compressed air expansion mode.

According to an embodiment of the invention, the valve assembly has a connecting valve that is configured to directly connect two compression spaces of a multicylinder compressed air compressor. The pressure control device is further configured to open the connecting valve in the idling mode, with the result that the compression spaces connected to the connecting valve are connected to one another. By the connecting valve being opened, a connection is made between the connected compression spaces, as a result of which, for example in the case of a conventional two-cylinder compressor, the air present in the compression spaces is, in each case, pressed into the other compression space during the upward stroke of the piston, and vice-versa. Advantageously, in such multicylinder compressors, the pistons are arranged contradirectionally to one another by an appropriate configuration of the crankshaft, such that, during the upward stroke of the piston, the adjacent piston executes a downward stroke.

According to an embodiment of the invention, all or at least some of the electrically actuatable valves are designed as piezoelectrically, electromagnetically, electromotively, electropneumatically or electrohydraulically actuatable valves. In this case, especially for those of the abovementioned embodiments in which mechanical crankshaft-dependent control is not provided at all, it is especially advantageous to use piezoelectrically actuatable valves since these make it possible to have especially short response and reaction times along with relatively large implementable passage cross sections for the compressed air.

According to another embodiment of the invention, all or at least some of the electrically actuatable valves are integrated into the cylinder of the compressed air compressor. The integration of the valves into the cylinder head can be especially advantageous. Also, all or at least some of the electrically actuatable valves can be integrated into the crankcase of the compressed air compressor. The advantage of this is that the compressed air compressor can be designed, together with the electrically actuatable valves, as a robust and compact unit, which can also be of a type that saves construction space. A further advantage is that the electrically actuatable valves can be arranged in the immediate vicinity of their respective place of use, so that rapid response times can be implemented because of short flow paths and small flow volumes.

According to an embodiment of the invention, all or at least some of the electrically actuatable valves precede the inlet connection of the compressed air compressor. Also, all or at least some of the electrically actuatable valves can follow the outlet connection of the compressed air compressor. The advantage of this is that the invention can be implemented with commercially available compressed air compressors, these not having to be modified at all or having to be modified only slightly. A simple and cost-effective possibility for retrofitting the present invention in existing compressed air installations is thereby also afforded.

According to another embodiment of the invention, the valve assembly is connected to an additional tap of the compression space of the compressed air compressor. This likewise permits a simple and cost-effective implementation, in combination with existing purchasable compressed air compressors, and therefore a simple possibility of retrofitting for the invention. The tap may be provided, for example, in the form of a bore on the cylinder head. The valve assembly is then connected to this bore.

According to a further embodiment of the invention, the volume of the compression space is variable in time. This does not mean, for example, that the compressor or part thereof, for example the cylinder, changes its form in time, but rather, for example in a piston compressor, an upward and a downward movement of the piston. In a volume reduction phase, the volume decreases in time, while in a volume enlargement phase, the volume increases in time. The pressure control device is configured, in the compressed air expansion mode, for connecting the compression space to the compressed air supply and storage installation during a volume enlargement phase and for connecting the compression space to the atmosphere during a volume reduction phase. In the compressed air expansion mode, therefore, the compression space is relieved in the volume reduction phase. The compressed air previously fed into the compression space during a volume enlargement phase can thus be discharged into the atmosphere. The compressed air compressor is consequently operated in the compressed air expansion mode "in reverse" to the compressed air generation mode. In the compressed air generation mode, compressed air is advantageously sucked in from the atmosphere during the volume enlargement phase and compressed air is dispensed to the compressed air supply and storage installation in a volume reduction phase.

According to an embodiment of the invention, the connection of the compression space to the compressed air supply and storage installation is made, in the compressed air expansion mode, only during part of the volume enlargement phase. As a result, the efficiency of the compressed air compressor as an assistant to the vehicle drive can be optimized in terms of energy consumption. In particular, because of this, only as much compressed air is consumed as is expedient and necessary for as economical a use as possible.

According to another embodiment of the invention, in the compressed air expansion mode, the connection of the compression space to the compressed air supply and storage installation is made immediately at the commencement of the volume enlargement phase. In the case of a piston compressor, this means that the compression space is connected to the compressed air supply and storage installation from the time when top dead center of the piston is reached.

According to a further embodiment of the invention, in the compressed air expansion mode the connection of the compression space to the compressed air supply and storage installation is made only during half the duration of the volume enlargement phase. As a result, compressed air consumption can be minimized and therefore the energy efficiency of the device can be increased. A further reduction in compressed air consumption can advantageously be achieved if the connection is made only during one quarter of the volume enlargement phase. A further reduction in compressed air consumption is advantageously possible if the connection is made only during one eighth of the volume enlargement phase. The expansion outlet valve is, in this case, kept open during one complete half revolution of the crankshaft from bottom dead center to top dead center. The control times for the crankshaft-dependent control of the expansion inlet valve and of the expansion outlet valve are set correspondingly.

Consistently, in another embodiment of the invention, the pressure control device is designed, in the compressed air generation mode, for connecting the compression space to the compressed air supply and storage installation during a volume reduction phase, especially when the pressure in the compression space is higher than the pressure in the compressed air supply and storage installation, and for connecting the compression space to the atmosphere during a volume enlargement phase, especially when the pressure in the compression space is lower than atmospheric pressure. To implement the compressed air generation mode, an arrangement of a compression inlet valve and a compression outlet valve, for example, in the compressor cylinder head, may advantageously be provided. The compression inlet valve and compression outlet valve may be designed as nonreturn valves, for example as lamella valves.

As described above, in the compressed air generation mode, the respective connection of the compression space to the atmosphere or to the compressed air supply and storage installation can be carried out purely by overpressure or underpressure control. In an advantageous embodiment of the invention, the control of these connections can take place in a crankshaft-dependent way, for example via a camshaft or by means of an electronic control apparatus. Also, the compression inlet valve can be opened during one complete half revolution between top dead center and bottom dead center of the piston. Further, the compression outlet valve may not be opened completely during half the crankshaft revolution, but only during part, in particular, during the last half of the crankshaft revolution, before top dead center is reached, or only during the last 35° of revolution before top dead center is reached.

According to an embodiment of the invention, in the compressed air expansion mode the quantity of compressed air can be fed into the compression space by the pressure control device synchronously with the rotation of the drive shaft of the compressed air compressor. Optimal efficiency in drive power assistance and accurate synchronicity with the rotation of an output shaft to the engine can thereby be ensured.

According to another embodiment of the invention, the pressure control device has a valve assembly with an aeration path and with a deaeration path for aerating and deaerating the compression space of the compressed air compressor. The aeration path and the deaeration path are connected or connectable to the compression space. The aeration path can be connected to the compressed air supply and storage installation and the deaeration path to the atmosphere. Advantageously, the valve assembly can be actuated mechanically via a camshaft connected or connectable to the output shaft of the engine. The camshaft control tried and tested in internal combustion engines can thereby also be used for controlling the compressed air compressor in the compressed air expansion mode. Camshaft controls can have a highly robust design with a long service life. The camshaft may be connected permanently to the output shaft of the engine or may be connectable temporarily to the output shaft of the engine, for example via an actuatable clutch. The camshaft may be implemented, for example, by the arrangement of cams on the crankshaft of the compressed air compressor. It is also possible to provide a separate camshaft connected to the crankshaft of the compressed air compressor or to the output shaft of the engine.

According to an embodiment of the invention, the valve assembly has at least one electrically actuatable solenoid valve. Moreover, an electronic control device for controlling the solenoid valve is provided. The design as a solenoid valve likewise makes it possible to have control of the compressed air compressor in the compressed air expansion mode, while tried and tested solenoid valve technology can be adopted, for example solenoid valves with a long service life, from the sector of antilock systems. The use of an electronic control device has the advantage that detection of the overrun phases and of the phases with an increased drive power demand can be integrated in a single control, together with the control of the compressed air compressor by the solenoid valve. Control may be implemented as a control program for a microprocessor provided in the electronic control device.

According to an embodiment of the invention, the electronic control device of the pressure control device is fed with a signal from a sensor, via which the position of the crankshaft of the compressed air compressor or, in the case of appropriate calibration regarding the position of the crankshaft of the engine, alternatively also the crankshaft position of the latter is detected. The signal may be fed directly to the electronic control device by a corresponding inductive, optical or otherwise suitable sensor. The electronic control device uses the signal indicating the position of the crankshaft for the in-phase control of the electrically actuatable valves of the valve assembly.

According to another embodiment of the invention, the electronic control device receives from an engine control apparatus information on the angular position of the output shaft of the vehicle engine. The engine control apparatus in this case serves for controlling the vehicle engine. Known engine control apparatuses have in any case information determined, for example, via sensors on the angular position of the output shaft of the vehicle engine. By the electronic control device being connected to the engine control apparatus, for example via a data bus provided in the vehicle, information on the angular position of the output shaft of the vehicle engine can be received cost-effectively in the electronic control device and can be used for controlling the solenoid valve in the compressed air expansion mode of the compressed air compressor.

Since the angular position of the output shaft of the vehicle engine with respect to the angular position of the crankshaft of the compressor may be different from vehicle to vehicle because of the type of mounting, according to an embodiment of the invention this relative position can be determined and compensated for by an electronic control device. For this purpose, the pressure peaks in the compressed air installation due to the compression action are evaluated in time via at least one pressure sensor present in the vehicle. An angle difference between the angular position of the crankshaft of the compressed air compressor and the angular position of the output shaft is determined as a correcting value from this. The electronic control device subsequently uses the calculated correcting value for the in-phase control of the valve assembly.

According to yet another embodiment of the invention, the pressure control device has a further valve, via which a crankcase of the compressed air compressor can be acted upon with compressed air. A further increase in the efficiency of assisting the vehicle drive is thereby possible. By the crankcase being acted upon by pressure, the assistance of the engine via an additional torque from the compressed air compressor can take place even in the volume reduction phases. A piston of the compressed air compressor can thus be acted upon with compressed air now from one side and now from the other side, depending on the operating phase (upward movement, downward movement). Thus, virtually permanent assistance of the engine by the compressed air compressor is possible during the entire revolution of the drive shaft of the compressed air compressor. The valve assembly for acting upon the compression space with compressed air is, in this case, operated complementarily in phase with the further valve assembly for acting upon the crankcase with compressed air. In other words, when the compression space is connected to the compressed air reservoir via the valve assembly, the crankcase is connected to the atmosphere. When the crankcase is acted upon with compressed air by the compressed air reservoir, the compression space is connected to the atmosphere.

The present invention generally relates, moreover, to a vehicle compressed air installation with a pressure control device and with a compressed air compressor of the type described above. According to one embodiment, the vehicle compressed air installation has a heat exchanger, which, on the one hand, is thermally coupled to the engine or to parts of the vehicle heated by the engine. On the other hand, the heat exchanger is thermally coupled to parts of the compressed air supply and storage installation for dispensing the heat absorbed by the engine or by parts heated by the engine, so that heat can be dispensed to the compressed air in the compressed air supply and storage installation and therefore the compressed air can be heated. To absorb the heat, the heat exchanger may be coupled directly to the engine or parts connected thereto, for example to the exhaust system or to the deconverter. The advantage of this is that the waste heat from the engine can be used for further increasing the energy efficiency of the vehicle compressed air installation. The compressed air is therefore fed with further energy, which can be utilized when the compressed air is used in the compressed air expansion mode or when the compressed air is used in another way in the compressed air installation, for example for braking the vehicle. In particular, by heat being dispensed to the compressed air, the available pressure in the compressed air reservoir or in other parts of the compressed air installation can be increased, so that compressed air at a higher level is available and can be used correspondingly.

According to another embodiment of the invention, the pressure control device is configured to permit dispensing of heat to the compressed air supply and storage installation only when the compressed air generation mode is not activated. The advantage of this is that, in the compressed air generation mode, the compressed air compressor does not have to convey counter to a backpressure, which is already increased by the heat supplied, which, in turn, has the advantage that less energy is used for driving the compressed air compressor and also the wear of the compressed air compressor is lower. For this purpose, the pressure control device may be equipped with a further, for example electrically actuatable, valve via which a heat fluid circuit through the heat exchanger can temporarily be shut off. Alternatively, for this purpose, a pump provided for conveying the heat fluid may also be switched off.

The present invention also generally relates to a compressed air compressor for such a vehicle compressed air installation.

Moreover, the present invention generally relates to a method for controlling pressure in a vehicle, the vehicle having at least one engine for generating vehicle drive power, a compressed air supply and storage installation and a compressed air compressor coupled or coupleable to the engine of the vehicle, having the following features:

a) in a compressed air generation mode, compressed air is conducted from a compression space of the compressed air compressor into the compressed air supply and storage installation, b) in a compressed air expansion mode, compressed air is conducted from the compressed air supply and storage installation into the compression space, c) the changeover from the compressed air generation mode into the compressed air expansion mode, and vice-versa, takes place as a result of the electrical actuation of one or more electrically actuatable valves of the valve assembly by means of an electronic control apparatus.

According to an embodiment of the invention, during an overrun phase when the vehicle is in operation, the compressed air compressor is operated in the compressed air generation mode and/or, in a phase with an increased drive power demand when the vehicle is in operation, the compressed air compressor is operated in the compressed air expansion mode.

Advantageously, the electronic control device and a pressure sensor, necessary where appropriate, may be designed as part of an EAPU. An EAPU is an electronically controlled air processing unit for a vehicle provided with a compressed air installation. In this case, in particular, the control function of the pressure control device may be implemented in the form of a program part in the control software of the EAPU.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

The invention is explained in more detail below by means of exemplary embodiments, with reference to the accompanying drawings in which.

The same reference symbols are used in the figures for corresponding elements.

DETAILED DESCRIPTION OF THE PREFERRED EMBODIMENTS

Figure 1:
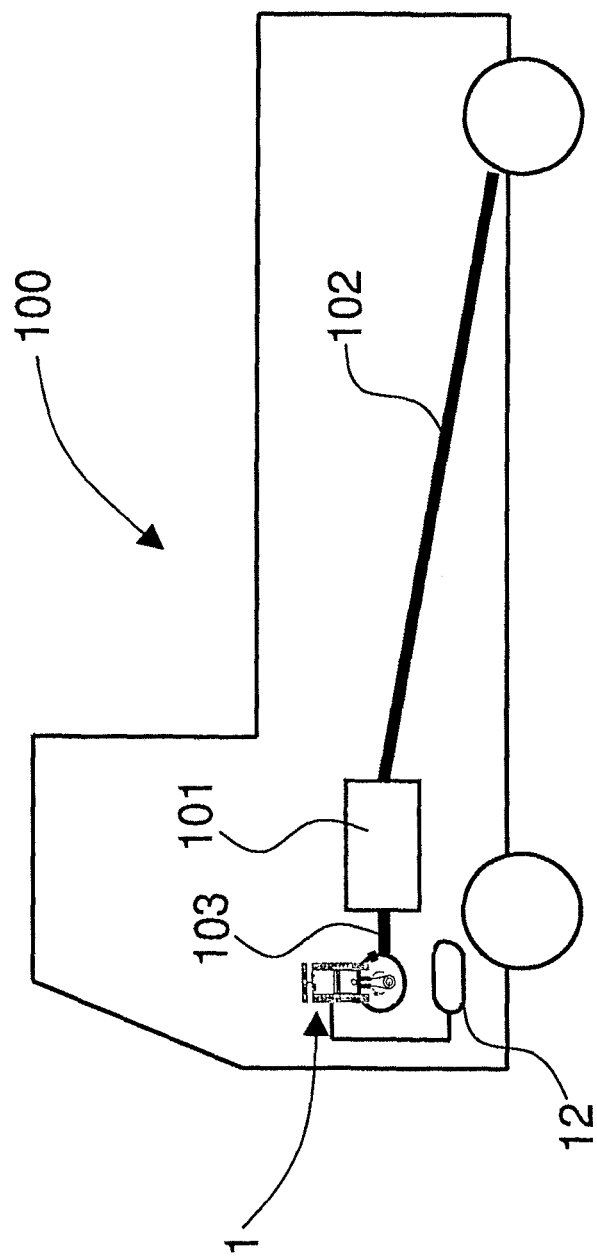
FIG. 1 illustrates a vehicle equipped with a compressed air compressor of a general type under consideration.

FIG. 1 illustrates a vehicle 100 that has an engine 101, for example a diesel engine, which, via a drive shaft 102 connected cardanically to the rear axle of the vehicle, can furnish drive power for driving the vehicle 100. The engine 101 is connected via a shaft 103 to a compressed air compressor 1 of the vehicle 100. The shaft 103 is at the same time the output shaft of the engine 101 and the drive shaft of the compressed air compressor 1. Depending on design, step-up may also be provided between the engine and the compressed air compressor by means of a transmission. Moreover, the compressed air compressor 1 is connected via a compressed air line to a compressed air supply and storage installation of the vehicle 100, the installation being symbolized in the drawing figures by a compressed air reservoir 12. The compressed air supply and storage installation has, for example, a multicircuit protection valve, an air dryer and a compressed air reservoir in the form of an overpressure-resistant vessel.

Insofar as the electrically actuatable valves are illustrated with a symbol for a magnet, this will embrace all types of electrical actuation, in particular piezoelectric, electromagnetic, electrohydraulic, electropneumatic and electromotive actuation.

Figure 2:
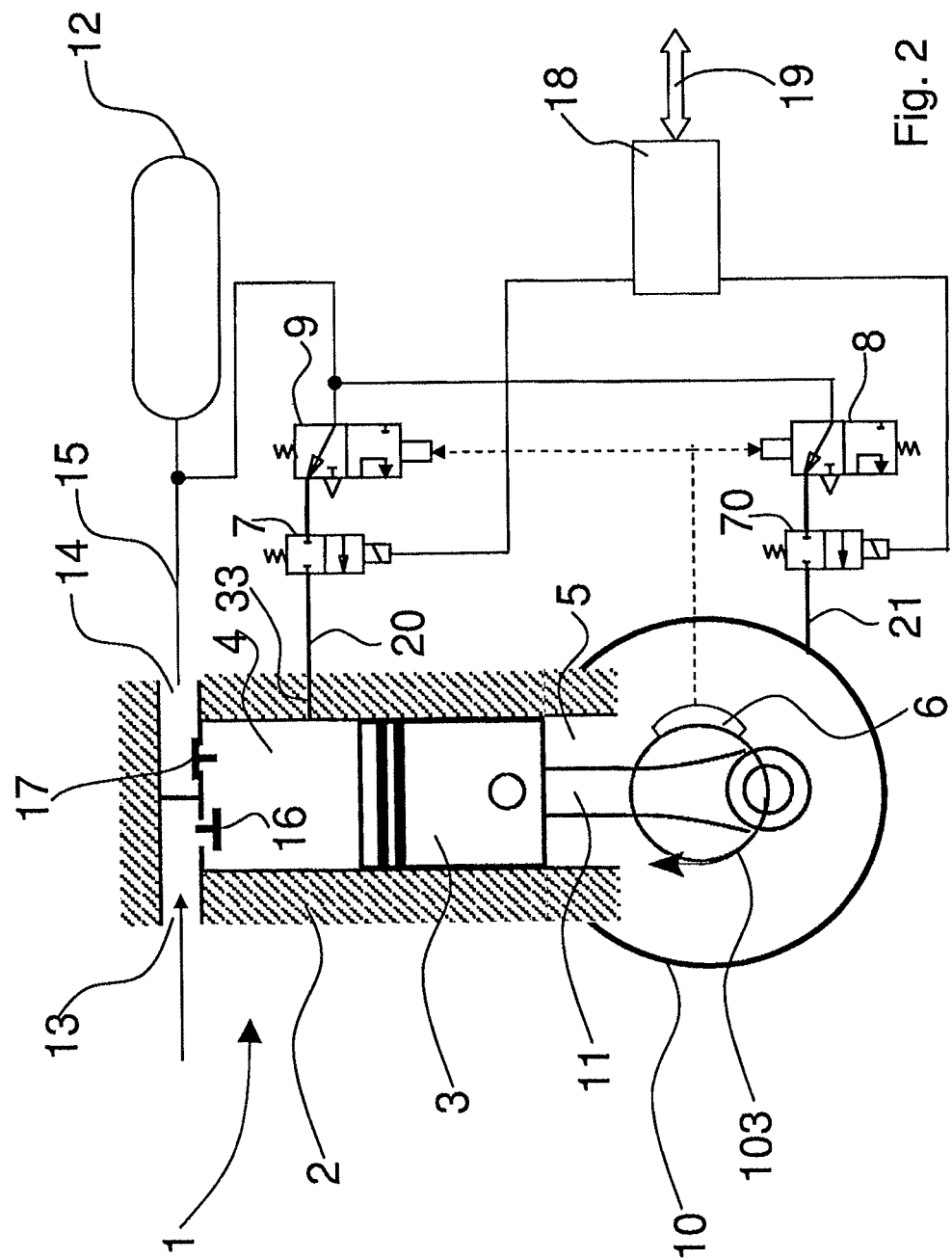
FIGS. 2 to 8 show the compressed air components of the vehicle together with various embodiments of the pressure control device according to the present invention.

FIG. 2 shows a diagrammatic illustration of the compressed air compressor 1, which may be designed as a single-cylinder or multicylinder compressed air compressor, and of the compressed air supply and storage installation, symbolized by the compressed air reservoir 12. The compressed air compressor 1 is designed as a conventional piston compressor. The compressed air compressor 1 has a cylinder 2 and a piston 3 located therein. Below the cylinder 2, the compressed air compressor 1 has a crankcase 10 in which a connecting rod drive for the piston 3 is provided. The connecting rod drive has a connecting rod 11 connected to the drive shaft 103 of the compressed air compressor 1 and which is connected on one side to the piston 3 and on the other side to a connecting rod pin on the drive shaft 103. When the drive shaft 103 rotates, the piston 3 is set in cyclic upward and downward movement via the connecting rod drive.

The piston 3 divides the compressed air compressor 1 into a compression space 4 and a crankshaft space, which is separate from the latter on the pressure medium side and which is connected on the pressure medium side to the inner space 5 of the crankcase 10. During a downward movement of the piston 3, the volume of the compression space 4 is enlarged. The compressed air compressor is then in a volume enlargement phase in which air is sucked in from the atmosphere via an inlet connection 13 and passes into the compression space 4 via a compression inlet valve 16 serving as an intake valve. The compression inlet valve 16 may be designed as a nonreturn valve that opens automatically as a result of underpressure in the compression space 4, as compared with atmospheric pressure, and closes automatically in the event of overpressure.

During an upward movement of the piston 3, the volume of the compression space 4 is reduced. The air located in it is compressed. When a pressure is reached in the compression space 4 that is higher than the pressure in the connected compressed air reservoir 12, a compression outlet valve 17, likewise designed as a nonreturn valve, opens. The compressed air is led via the latter from the compression space 4 to an outlet connection 14 of the compressed air compressor 1 and passes via a compressed air line 15 into the compressed air reservoir 12. In a volume enlargement phase, the compression outlet valve 17 closes automatically on account of the underpressure present in the compression space 4, as compared with the pressure at the outlet connection 14 of the compressed air compressor 1.

FIG. 2 also illustrates, as part of a pressure control device, an electronic control device designed as an electronic control apparatus 18. The electronic control apparatus 18 is connected via a data connection 19, for example a databus in the form of a CAN bus, to further electronic devices in the vehicle. In particular, the electronic control apparatus 18 can be connected to an engine control apparatus of the vehicle engine. The electronic control apparatus 18 is connected via an electrical line to a first electrically actuatable valve 7 designed as a solenoid valve in the form of a 2/2-way valve. The first electrically actuatable valve 7 is connected via a compressed air line 20 to a tap 33 of the compression space 4. The tap 33 may be designed, for example, as a bore in the cylinder 2 of the compressed air compressor. The first electrically actuatable valve 7 can be switched from the shut-off position illustrated in FIG. 2 into a passage position by the electronic control apparatus 18. In the passage position, the first electrically actuatable valve 7 connects the compression space 4 to a first mechanically actuatable valve 9 of the illustrated valve assembly 7, 8, 9, 70. In the shut-off position, the first electrically actuatable valve 7 separates this connection. Moreover, the electronic control apparatus 18 is connected via an electrical line to a second electrically actuatable valve 70 designed as a solenoid valve in the form a 2/2-way valve. The second electrically actuatable valve 70 can be switched from the shut-off position illustrated in FIG. 2 into a passage position by the electronic control apparatus 18. In the passage position, the second electrically actuatable valve 70 connects the inner space 5 of the crankcase 10 to a second mechanically actuatable valve 8 of the illustrated valve assembly 7, 8, 9, 70. In the shut-off position, the second electrically actuatable valve 70 separates this connection.

The first mechanically actuatable valve 9 is designed as a mechanically actuatable 3/2-way valve. In an aeration position, which is illustrated in FIG. 2, the first mechanically actuatable valve 9 connects the compression space 4 via a compressed air line 20 to the compressed air reservoir 12, insofar as the first electrically actuatable valve 7 is in the passage position. In a deaeration position, the first mechanically actuatable valve 9 connects the compression space 4 via the compressed air line 20 to the atmosphere, insofar as the first electrically actuatable valve 7 is in the passage position.

The second mechanically actuatable valve 8 is likewise designed as a mechanically actuatable 3/2-way valve. The second mechanically actuatable valve 8 is connected via a compressed air line 21 to the inner space 5 of the crankcase 10. The second mechanically actuatable valve 8 has a comparable function to the first mechanically actuatable valve 9, to be precise, a connection of the crankshaft 10 selectively to the compressed air reservoir 12 or to the atmosphere, insofar as the second electrically actuatable valve 70 is in the passage position.

The first and the second mechanically actuatable valves 8, 9 are actuated mechanically via a camshaft control. A cam 6 is illustrated symbolically on the drive shaft 103 of the compressed air compressor 1. The camshaft control is illustrated by dashed lines from the cam 6 to mechanical actuation elements of the mechanically actuatable valves 8, 9. The camshaft control is designed such that the mechanically actuatable valves 8, 9 are actuated complementarily in phase, that is, with the first mechanically actuatable valve 9 actuated mechanically, the second mechanically actuatable valve 8 is nonactuated. With a second mechanically actuatable valve 8 actuated mechanically, the first mechanically actuatable valve 9 is nonactuated. As a result, in the compressed air expansion mode, the compression space 4 and the inner space 5 of the crankcase 10 are acted upon alternately with compressed air from the compressed air reservoir 12.

The electronic control apparatus 18 switches the first and the second electrically actuatable valves 7, 70 into the passage position in the compressed air expansion mode and into the shut-off position in the compressed air generation mode.

In the embodiment according to FIG. 2 the pressure control device comprises the electronic control apparatus 18 and a valve assembly formed from the electrically actuatable valves 7, 70 and from the mechanically actuatable valves 8, 9.

Figure 3:
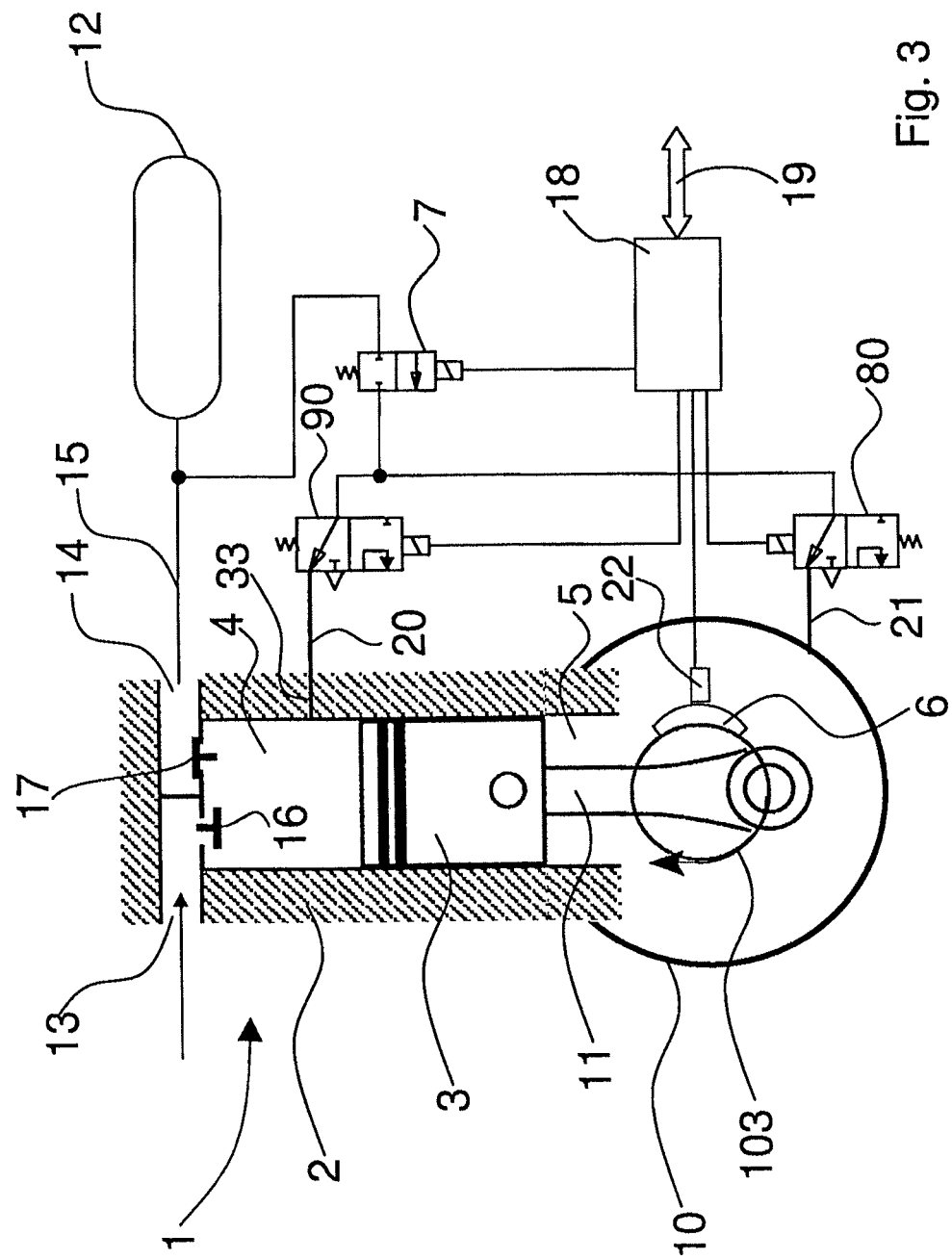

FIG. 3 shows a further embodiment of the pressure control device. The pressure control device again has the electronic control apparatus 18. The valves 8, 9 actuatable mechanically via the camshaft control according to FIG. 2 are designed according to FIG. 3 as electrically actuatable solenoid valves, specifically as a third electrically actuatable valve 80 and as a fourth electrically actuatable valve 90, these valves being controllable by the electronic control apparatus 18 via electrical lines. In terms of their pneumatic valve function, the third and the fourth electrically actuatable valves 80, 90 correspond to the mechanically actuatable valves 8, 9 described with reference to FIG. 2. The solenoid valve 7 of FIG. 3 corresponds to the first electrically actuatable valve 7 according to FIG. 2, in the version according to FIG. 3 only the first electrically actuatable valve 7 being provided as a central shut-off/passage valve arranged between the third and fourth electrically actuatable valves 80, 90 and the compressed air reservoir 12. The use of two solenoid valves 7, 70, as in FIG. 2, is basically also possible in the version according to FIG. 3, but is not absolutely necessary, since the third and the fourth electrically actuatable valves 80, 90 are not permanently camshaft-controlled, but instead can be brought by the electronic control apparatus 18, in the compressed air generation mode, into a neutral position for compressed air generation. Thus, in the compressed air generation mode, the third electrically actuatable valve 80 can be nonactuated and the fourth electrically actuatable valve 90 can be actuated. The version according to FIG. 3 can thereby be designed cost-effectively with only one solenoid valve 7 as a central shut-off/passage valve.

The control of the third and of the fourth electrically actuatable valves 80, 90 is carried out by the electronic control apparatus 18 synchronously with the rotation of the drive shaft 103 of the compressed air compressor 1 on the basis of information the electronic control apparatus 18 receives from an engine control apparatus via the databus 19. Maximum efficiency in the assistance of the engine by the compressed air compressor can thereby be ensured.

A correcting value, required if appropriate, of the relative angular position of the crankshaft of the compressed air compressor 1 with respect to the position of the drive shaft 103 can be calculated and taken into account by the electronic control apparatus 18 on the basis of the evaluation in time of the pressure peaks via the pressure sensors present in the vehicle.

Alternatively, to detect the rotary angle position of the drive shaft 103, the electronic control apparatus 18 may also be connected to an electrical sensor 22, which directly detects the rotary angle position of the drive shaft 103 or of the crankshaft of the compressed air compressor 1. The sensor 22 may, for example, be designed in a similar way to a sensor of an antilock system as an inductive sensor, which senses the angular position of the drive shaft 103 or of the crankshaft of the compressed air compressor 1 by detecting the position of a cam 6.

As can be seen, in the embodiment according to FIG. 3 the pressure control device comprises the electronic control apparatus 18, the sensor 22 and a valve assembly formed from the first, the third and the fourth electrically actuatable valves 7, 80, 90.

In the devices according to FIGS. 2 and 3, the compressed air expansion mode is activated by the electronic control apparatus 18, in that the first electrically actuatable valve 7 and, if appropriate, the second electrically actuatable valve 70 are switched from the shut-off position into the passage position. It thereby becomes possible for the compression space or the inner space 5 of the crankcase 10 to be acted upon with corresponding pressure via the first and the second mechanically actuatable valves 8, 9 or the third and the fourth electrically actuatable valves 80, 90. By the compression inlet valve 16 being designed as a nonreturn valve, there is no need for special control of the compression inlet valve 16 in the compressed air expansion mode. By the compression space being acted upon with compressed air via the compressed air line 20, the compression inlet valve 16 closes automatically. Also, there is no need for special control of the compression outlet valve 17, since this is kept closed via the pressure prevailing at the outlet connection 14 via the compressed air line 15.

The embodiments according to FIGS. 2 and 3 may also be implemented without those valves that are provided for acting with pressure upon the crankcase 10. In this case, the invention can be implemented with fewer modifications to the compressed air compressor and with fewer components, but also without the possibility of assisting the vehicle drive in the upward phases of the piston 3. Similarly, the embodiments described below according to FIGS. 4 to 8 may also additionally be configured with the action of pressure upon the crankcase 10, as described with reference to FIGS. 2 and 3.

Figure 4:
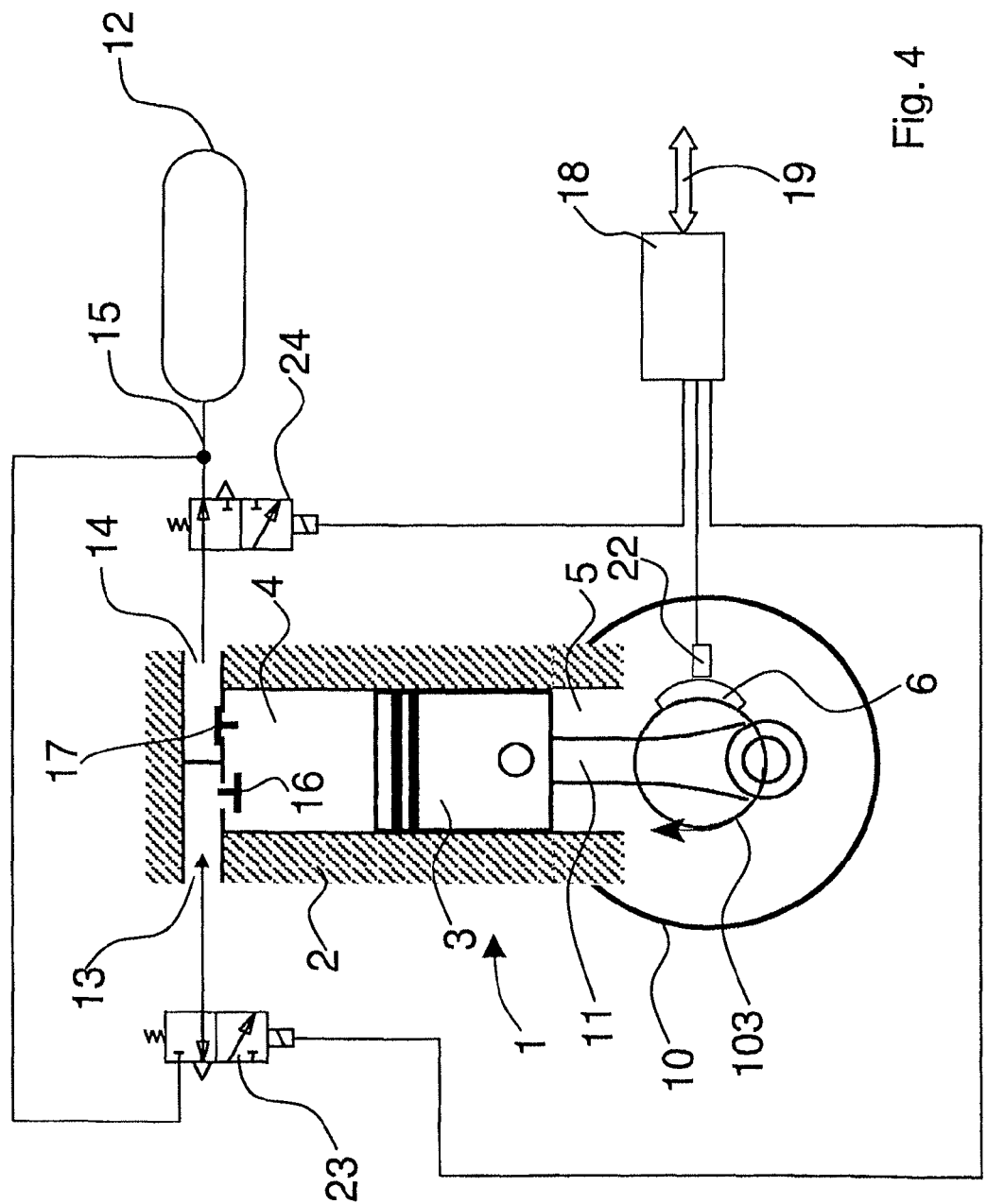

FIG. 4 shows an advantageous embodiment of the pressure control device that can be used in conjunction with a compressed air compressor 1 of conventional construction, without modifications to the compressed air compressor being necessary. The embodiment according to FIG. 4 is therefore suitable especially for the retrofitting of the invention on existing vehicles, in which no additional compressed air connection is to be retrofitted on the compression space 4 of the compressed air compressor 1. The pressure control device has the electronic control apparatus 18, which can be connected to the databus 19 or to a sensor 22, as required. The pressure control device also has a fifth electrically actuatable valve 23 designed as a solenoid valve and a sixth electrically actuatable valve 24 designed as a solenoid valve. The fifth electrically actuatable valve 23 precedes the inlet connection 13 of the compressed air compressor 1. The sixth electrically actuatable valve 24 follows the outlet connection 14 of the compressed air compressor and is arranged in the compressed air line 15 to the compressed air reservoir 12. The fifth electrically actuatable valve 23 is designed as a 3/2-way valve. The sixth electrically actuatable valve 24 is likewise designed as a 3/2-way valve. However, the 3/2-way valves may also be designed as a combination of two 2/2-way valves.

The fifth electrically actuatable valve 23, in one switching position, can connect the inlet connection 13 of the compressed air compressor 1 to the atmosphere, as illustrated in FIG. 4. In a second switching position, the fifth electrically actuatable valve 23 can connect the inlet connection 13 to the compressed air reservoir 12.

In the switching position illustrated in FIG. 4, the sixth electrically actuatable valve 24 can connect the outlet connection 14 of the compressed air compressor to the compressed air reservoir 12. In a second switching position, the sixth electrically actuatable valve 24 can connect the outlet connection 14 to the atmosphere.

The electronic control apparatus 18 controls the fifth and the sixth electrically actuatable valves 23, 24 such that, in the compressed air generation mode, both the fifth electrically actuatable valve 23 and the sixth electrically actuatable valve 24 are nonactuated and are therefore in their switching position illustrated in FIG. 4. In this case, the inlet connection 13 is connected to the atmosphere and the outlet connection 14 is connected to the compressed air supply and storage installation 12. In the compressed air expansion mode, the electronic control apparatus 18 activates the fifth and the sixth electrically actuatable valves 23, 24 as a function of the rotary angle position of the drive shaft 103, that is, depending on the presence of a volume reduction phase or volume enlargement phase. The rotary angle position is determined, for example, via the sensor 22 or by the reception of corresponding information from an engine control apparatus via the databus 19.

In the compressed air expansion mode, the electronic control apparatus 18 actuates the fifth electrically actuatable valve 23 in a volume enlargement phase. The compression space 4 is thereby connected to the compressed air reservoir 12 so that the compression space 4 is acted upon with the pressure in the compressed air reservoir 12 via the automatically opening compression inlet valve 16. The sixth electrically actuatable valve 24 is in this case nonactuated. The compression outlet valve 17 is thereby kept closed via the pressure coming from the compressed air reservoir 12.

In the compressed air expansion mode, the electronic control apparatus 18 actuates the sixth electrically actuatable valve 24 in a volume reduction phase, while the fifth electrically actuatable valve 23 is nonactuated. The pressure built up in the compression space 4 is thereby broken down via the deaeration connection of the sixth electrically actuatable valve 24 by means of the automatically opening compression outlet valve 17. As a result of the nonactuated fifth electrically actuatable valve 23, the inlet connection 13 is connected to the atmosphere, so that compressed air cannot continue to flow from the compressed air reservoir 12 in an undesirable way.

As can be seen, in the embodiment according to FIG. 4, the pressure control device comprises the electronic control apparatus 18 and a valve assembly formed from the fifth and the sixth electrically actuatable valves 23, 24.

Figure 5:
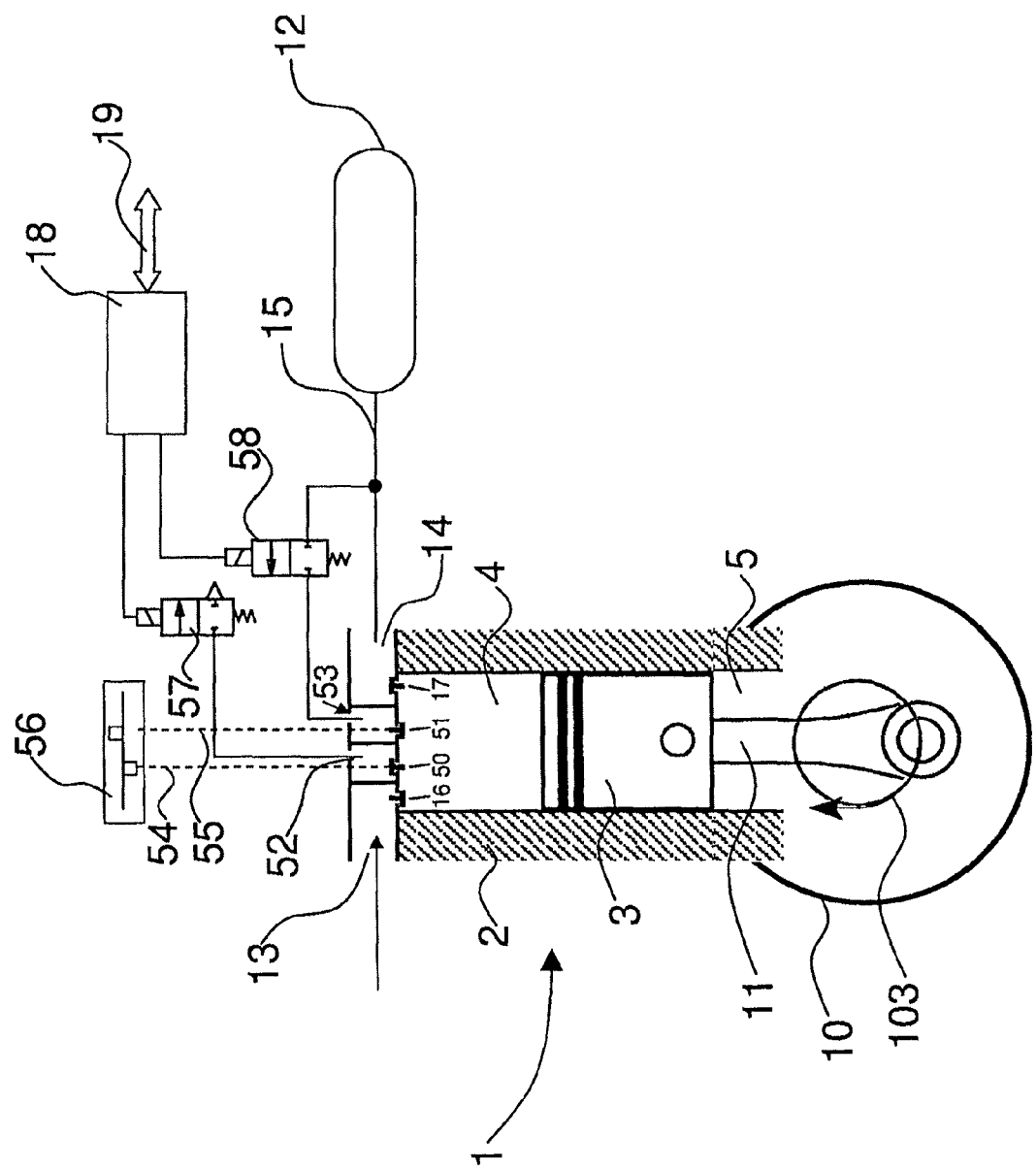

FIG. 5 shows an embodiment in which the cylinder head of the compressed air compressor 1 has been modified. The cylinder head has, in addition to the compression inlet valve 16 and compression outlet valve 17 discussed above with reference to FIGS. 2 to 4, an expansion outlet valve 50 and an expansion inlet valve 51. When the compressed air compressor is operating in expansion, that is, in the compressed air expansion mode, in which the compressed air compressor 1 assists the drive of the vehicle, the feed of air into the compression space 4 and its discharge are controlled via the expansion outlet valve 50 and the expansion inlet valve 51. The expansion outlet valve 50 is connected via a separate expansion outlet connection 52 of the cylinder head to a seventh electrically actuatable valve 57 designed as a 2/2-way valve. The seventh electrically actuatable valve 57, when actuated electrically, connects the expansion outlet connection 52 to the atmosphere or, in the nonactuated position illustrated in FIG. 5, shuts off the expansion outlet connection 52 with respect to the atmosphere. The expansion inlet valve 51 is connected via a separate expansion inlet connection 53 in the cylinder head to an eighth electrically actuatable valve 58 designed as a 2/2-way valve. In an actuated position, the eighth electrically actuatable valve 58 connects the expansion inlet connection 53 to the compressed air supply and storage installation 12 or shuts off this connection in the nonactuated position, which is illustrated in FIG. 5. The seventh and the eighth electrically actuatable valves 57, 58 are connected, for electrical actuation, to the electronic control apparatus 18.

Moreover, the expansion outlet valve 50 and expansion inlet valve 51 are mechanically crankshaft-controlled, specifically via a camshaft 56 by means of actuating tappets 54, 55, which act mechanically on the expansion outlet valve 50 and the expansion inlet valve 51, respectively. The camshaft 56 is connected to the crankshaft of the compressed air compressor 1, the crankshaft corresponding at the same time to the drive shaft 103, or is connected to the output shaft of the engine 101.

The electronic control apparatus 18 leaves the seventh and eighth electrically actuatable valves 57, 58 nonactuated in the compressed air generation mode. In this case, the compressed air compressor 1 carries out compressed air generation as a result of the normal functioning of the compression inlet valve 16 and compression outlet valve 17. In the compressed air expansion mode, the electronic control apparatus 18 actuates the seventh and the eighth electrically actuatable valves 57, 58 permanently. The camshaft control of the expansion outlet valve 50 and of the expansion inlet valve 51 is thereby activated. By means of the camshaft control, the expansion inlet valve 51 is opened in a volume enlargement phase, that is, during a downward movement of the piston 3, with the result that compressed air can flow from the compressed air reservoir 12 via the eighth electrically actuatable valve 58 into the compression space 4. In a volume reduction phase, that is, during an upward movement of the piston 3, the expansion inlet valve 51 is closed by the camshaft control. At the same time, the expansion outlet valve 50 is opened by the camshaft control, so that the air in the compression space 4 can escape into the atmosphere via the seventh electrically actuatable valve 57. In this case, in the compressed air expansion mode, the compression inlet valve 16 is kept closed automatically by the overpressure located in the compression space 4. The compression outlet valve 17 is kept closed by the pressure prevailing at the outlet connection 14 from the compressed air reservoir 12.

In the embodiment according to FIG. 5, the pressure control device comprises the electronic control apparatus 18 and a valve assembly formed from the seventh and the eighth electrically actuatable valves 57, 58.

Figure 6:
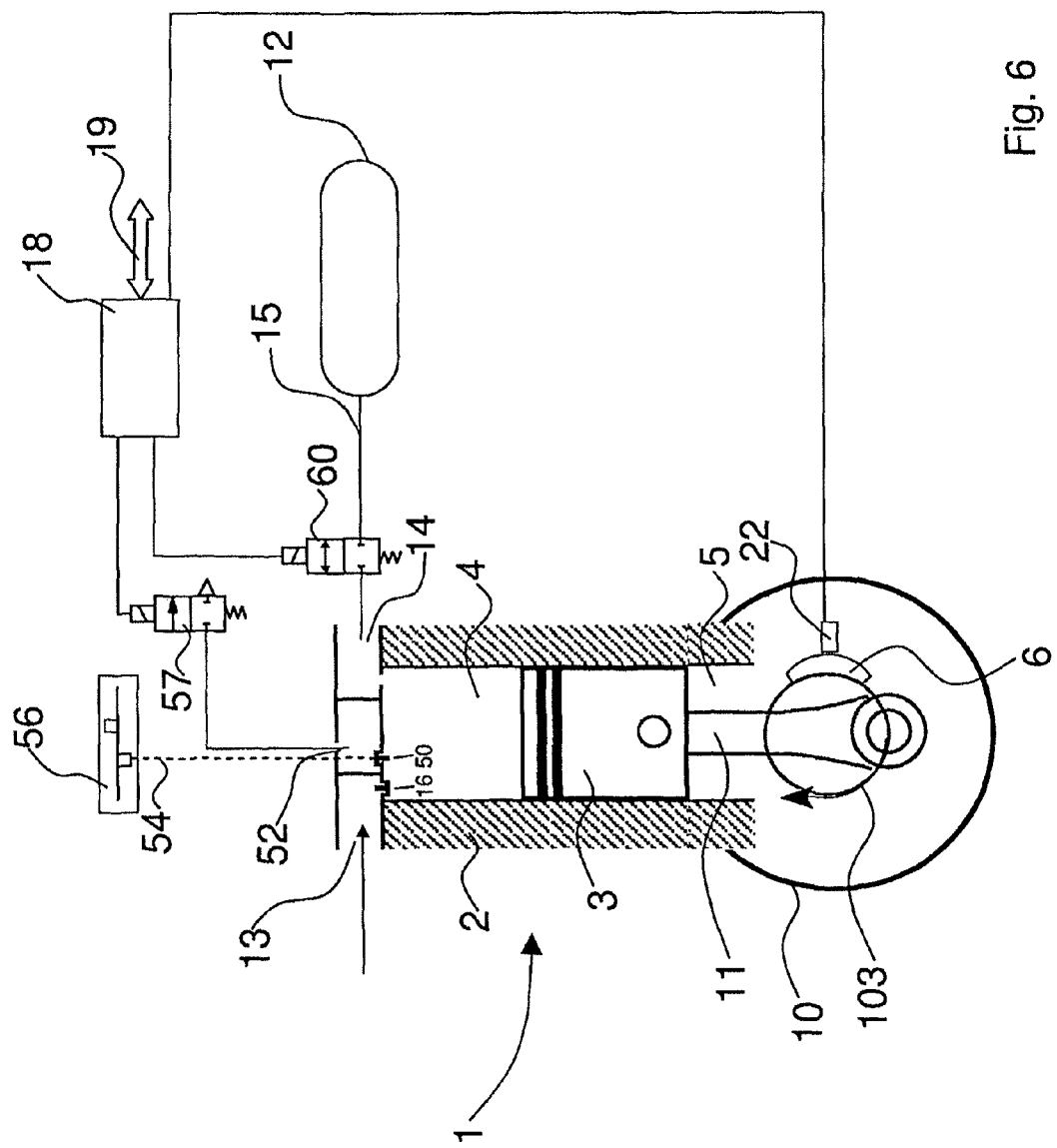

FIG. 6 shows an embodiment that resembles the embodiment of FIG. 5, and therefore only the salient differences are addressed below. According to FIG. 6, only the expansion outlet valve 50 is camshaft-controlled in the same way as described above with regard to FIG. 5. Control takes place in a comparable way to the embodiment according to FIG. 5, using the seventh electrically actuatable valve 57.

In contrast to FIG. 5, in the embodiment according to FIG. 6 no expansion inlet valve 51 and no compression outlet valve 17 are provided. Instead, the connections 14, 53 illustrated in FIG. 5 are combined into one common outlet connection 14 in the cylinder head of the compressed air compressor 1. The outlet connection 14 is connected to the compressed air supply and storage installation 12 via a ninth electrically actuatable valve 60 designed as a 2/2-way valve. The ninth electrically actuatable valve 60 can be actuated electrically by the electronic control apparatus 18. When actuated, the ninth electrically actuatable valve 60 connects the outlet connection 14 to the compressed air supply and storage installation 12. In the nonactuated case, as illustrated in FIG. 6, this connection is shut off.

The electronic control apparatus 18 controls the seventh electrically actuatable valve 57 in the same way as described above with regard to FIG. 5. The camshaft control of the expansion outlet valve 50 also takes place in the same way. In contrast to FIG. 5, in the embodiment according to FIG. 6 the ninth electrically actuatable valve 60 is actuated differently by the electronic control apparatus 18 according to programming provided in the latter, depending on the operating mode of the compressed air installation. In the compressed air generation mode, the electronic control apparatus 18 actuates the ninth electrically actuatable valve 60 as a function of the crankshaft position, which is detected via the sensor 22, such, during a volume reduction phase, the ninth electrically actuatable valve 60 is actuated only at the end of the volume reduction phase, for example at a crankshaft angle of about 35 to 45° before top dead center is reached. This ensures that the compression space 4 is connected to the compressed air reservoir 12 only when overpressure is achieved. Advantageously, moreover, the electronic control apparatus 18 is supplied with information on the currently prevailing pressure in the compressed air reservoir 12. The information can be supplied to the electronic control apparatus 18 either via the databus 19 or via a separate pressure sensor connected to the compressed air reservoir 12 or to other parts of the compressed air supply and storage installation. Advantageously, the commencement of actuation of the ninth electrically actuatable valve 60 and the duration of actuation are fixed by the electronic control apparatus 18 as a function of the current pressure in the compressed air reservoir 12. For this purpose, corresponding characteristic curves or data can be stored in the electronic control apparatus 18.

In the compressed air expansion mode, the electronic control apparatus 18 actuates the ninth electrically actuatable valve 60 likewise as a function of the crankshaft angle, specifically when a volume enlargement phase commences. For example, the electronic control apparatus 18 switches on the ninth electrically actuatable valve 60 just when top dead center is reached and switches the ninth electrically actuatable valve 60 off again, for example, at a crankshaft angle of 15 to 30° after top dead center.

As can be seen, in the embodiment according to FIG. 6, the pressure control device comprises the electronic control apparatus 18 and a valve assembly formed from the seventh and the ninth electrically actuatable valves 57, 60.

Figure 7:
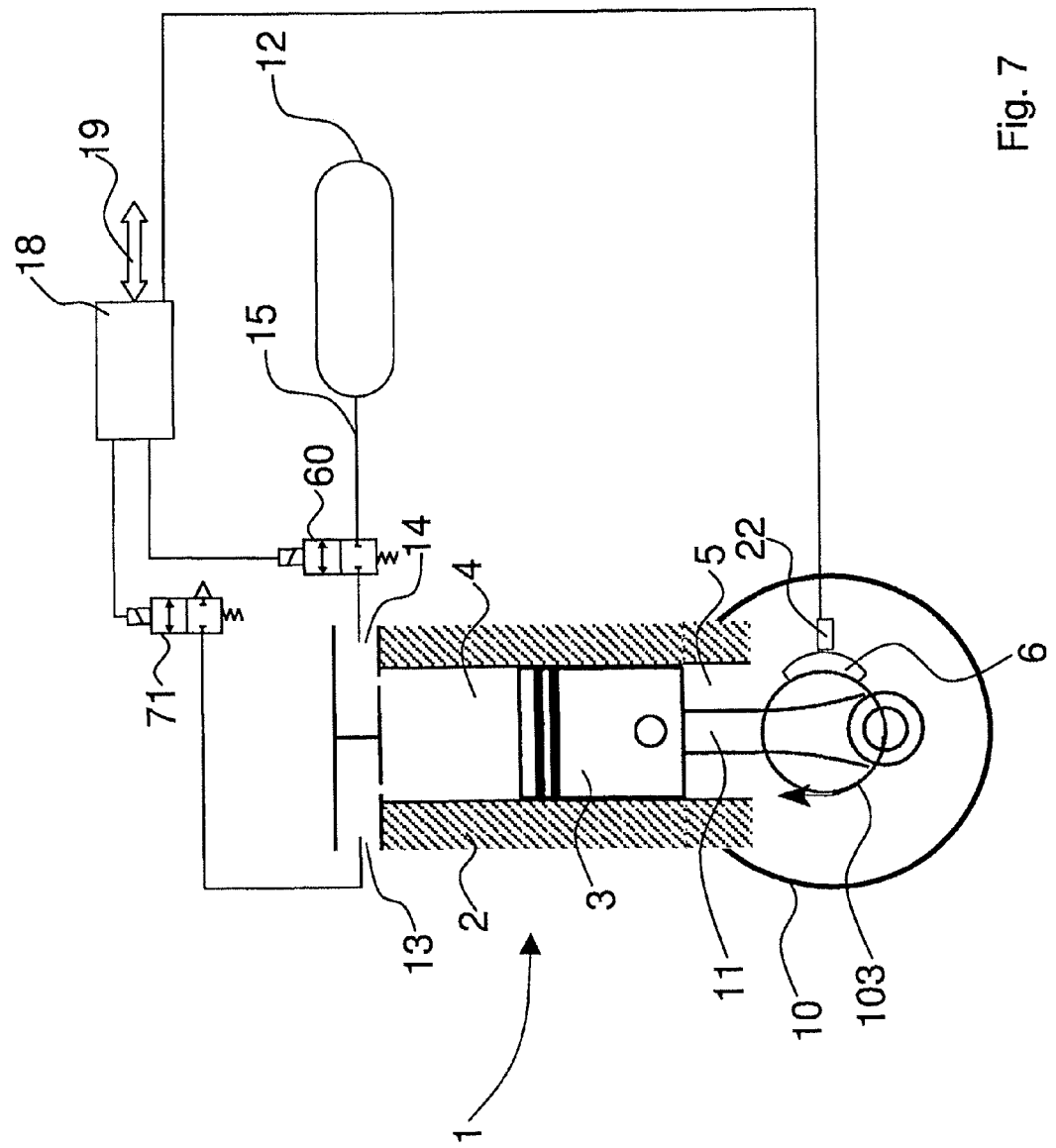

FIG. 7 shows an embodiment of the invention that is optimized further in terms of component outlay. In this case, the compressed air compressor 1 is freed of all the valves illustrated in the cylinder head in the embodiment according to FIG. 5, to be precise, the compression inlet valve 16, compression outlet valve 17, expansion outlet valve 50 and expansion inlet valve 51. Instead, the inlet connection 13 can be connected to the atmosphere via a tenth electrically actuatable valve 71 designed as a 2/2-way valve. The outlet connection 14 can be connected to the compressed air supply and storage installation 12 via the ninth electrically actuatable valve 60 discussed above with reference to FIG. 6. In FIG. 7, the ninth and the tenth electrically actuatable valves 60, 71 are again illustrated in the nonactuated case, that is, in the shut-off position. If the ninth or the tenth electrically actuatable valve 60, 71 is actuated electrically by the electronic control apparatus 18, it is switched into the respective passage position.

The electronic control apparatus 18 in this case controls the ninth electrically actuatable valve 60 in the compressed air generation mode and in the compressed air expansion mode in the same way as described above with regard to FIG. 6. The tenth electrically actuatable valve 71 is controlled by the electronic control apparatus 18 in the compressed air generation mode as a function of the crankshaft angle such that, when underpressure is present in the compression space 4, the connection to the atmosphere is made. In an advantageous embodiment, the tenth electrically actuatable valve 71 is opened during the entire volume enlargement phase, that is, from top dead center to bottom dead center. In one embodiment, in the compressed air expansion mode, the tenth electrically actuatable valve 71 is opened continuously by the electronic control apparatus 18 during the entire volume reduction phase, that is, from bottom dead center to top dead center. In the remaining times, the tenth electrically actuatable valve 71 is nonactuated and therefore the connection to the atmosphere is shut off.

In the embodiment according to FIG. 7, the pressure control device comprises the electronic control apparatus 18 and a valve assembly formed from the ninth and the tenth electrically actuatable valves 60, 71.

Figure 8:
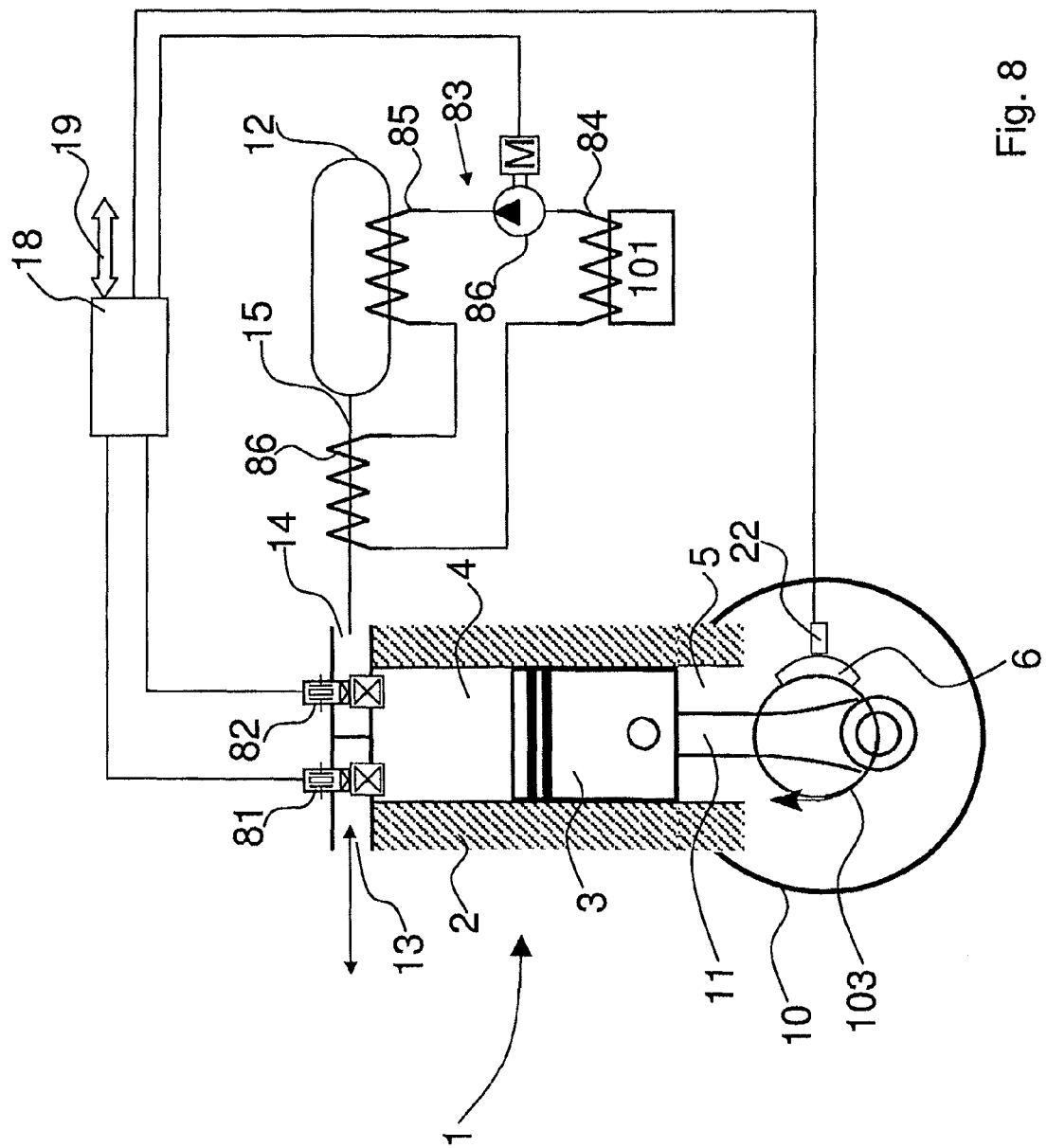

FIG. 8 shows a further embodiment of the invention, in which, with regard to the ninth and tenth electrically actuatable valve 60, 71 discussed above with reference to FIG. 7, the same functional principle is implemented as in the embodiment of FIG. 7. In contrast to FIG. 7, the electrically actuatable valves are designed as piezoelectrically actuatable 2/2-way valves integrated directly into the cylinder head and taking the form of an eleventh electrically actuatable valve 81 and of a twelfth electrically actuatable valve 82. The eleventh and the twelfth electrically actuatable valves 81, 82 likewise have again in each case an opening position assumed during actuation and a closing position. When actuated, the eleventh electrically actuatable valve 81 connects the inlet connection 13 to the compression space 4, and in the nonactuated case this connection is shut off. When actuated, the twelfth electrically actuatable valve 82 connects the outlet connection 14 to the compression space 4, and in the nonactuated case this connection is shut off.

In the embodiment according to FIG. 3, the pressure control device comprises the electronic control apparatus 18 and a valve assembly formed from the eleventh and the twelfth electrically actuatable valves 81, 82.

FIG. 8 illustrates by way of example a further embodiment of the invention. A heat exchanger 83 is provided. The heat exchanger 83 has a heat absorption element 84, which may be designed, for example, as a spiral coil. The heat absorption element 84 is coupled thermally to the engine 101 or to a part connected thermally to the latter. Moreover, the heat exchanger 83 has a first heat dispensing element 85, which is coupled thermally to the compressed air reservoir 12, and a second heat dispensing element 86, which is coupled thermally to the compressed air line 15. It is also possible that only one of the heat dispensing elements 85, 86 is provided. The heat dispensing elements 85, 86 may be constructed in a comparable way to the heat absorption element 84. The heat absorption element 84, the first heat dispensing element 85 and the second heat dispensing element 86 are connected to one another via corresponding pipelines. A heat transfer medium, for example water, is pumped through the pipelines. For this purpose, a, for example, electromotively driven pump 86 is arranged in one of the pipelines. The pump 86 may be controlled electrically by the electronic control apparatus 18. The electronic control apparatus 18 can in this case switch the pump 86 on or off, as required. Owing to the heat exchanger 83 described, waste heat from the engine 101 can be utilized for heating the compressed air in the compressed air supply and storage installation 12.

Figure 9:
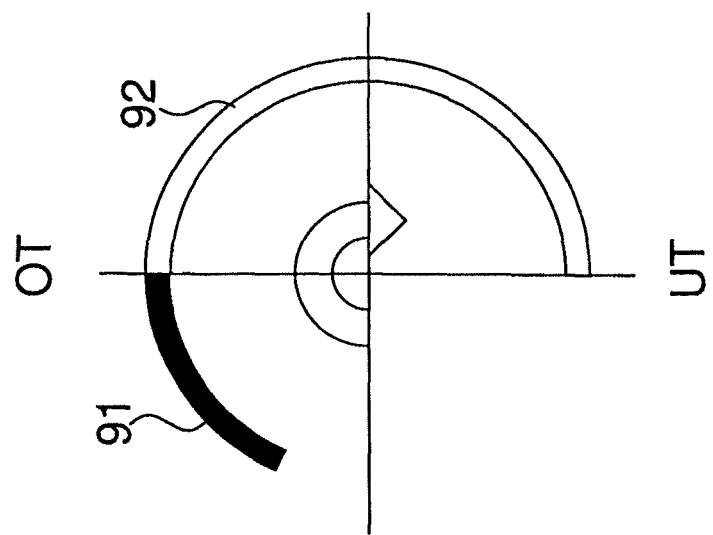

FIG. 9 shows control times of the various above-described valves as a function of the crankshaft angle φ of the compressed air compressor 1. FIG. 9 illustrates the control times when the compressed air compressor 1 is operated as a compressor, that is, in the compressed air generation mode. As can be seen, in an angular range from bottom dead center BDC to top dead center TDC (volume reduction phase), a valve connecting the compression space 4 to the compressed air supply and storage installation 12 is opened only during a comparatively short time segment 91. The valve is closed when top dead center TDC is reached. In this period of time, compressed air can flow out of the compression space 4 into the compressed air supply and storage installation 12. By contrast, in the volume enlargement phase, starting with top dead center TDC and going to bottom dead center BDC, a valve connecting the compression space 4 to the atmosphere is opened during a relatively long period of time 92, which extends over the entire volume enlargement phase.

Figure 10:
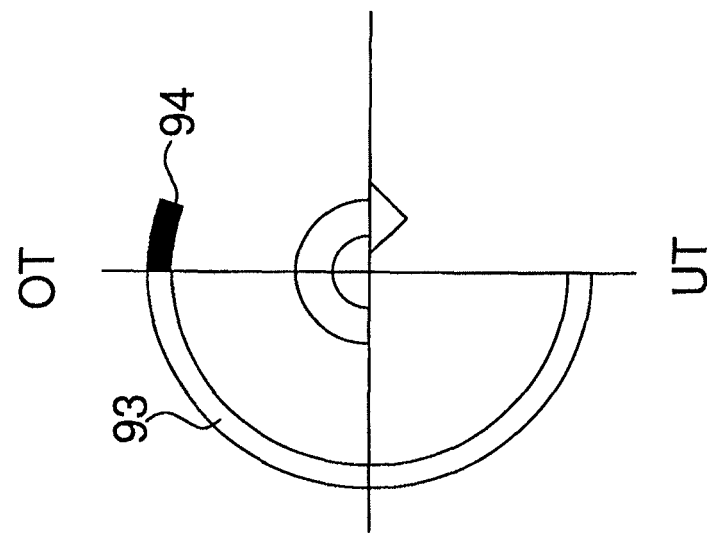
FIGS. 9 and 10 show exemplary valve control times of the pressure control device according to embodiments of the present invention.

FIG. 10 shows actuation of the abovementioned valves when the compressed air compressor operates by expansion, that is, in the compressed air expansion mode in which the compressed air compressor serves at the same time as a drive for the vehicle. Valve actuation via the crankshaft angle φ of the compressed air compressor 1 is illustrated once again. As can be seen, during the volume reduction phase, a valve connecting the compression space 4 to the atmosphere is opened for a relatively long period of time 93, which extends over the entire volume reduction phase from bottom dead center BDC to top dead center TDC. By contrast, after top dead center TDC is reached, another valve connecting the compression space 4 to the compressed air supply and storage installation 12 is opened immediately. However, this valve is opened only for a comparatively short period of time 94 and is closed again at once, for example about 15° after top dead center.

It is advantageous to configure the abovementioned valves with sufficiently large compressed air cross-sectional areas, in order to ensure rapid filling and deaeration of the compression space 4 or of the inner space 5 of the crankcase 10 in the compressed air expansion mode.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A pressure control device for a vehicle, the vehicle having at least one engine for generating vehicle drive power, a compressed air supply and storage installation, and a compressed air compressor coupleable to the vehicle engine, the pressure control device comprising:

at least one electronic control apparatus; and at least one valve assembly, separate from and coupleable to the compressed air compressor, for controllably connecting a compression space of the compressed air compressor and the compressed air supply and storage installation, the pressure control device being configured to:

(a) connect the compression space to the compressed air supply and storage installation in a compressed air generation mode to convey compressed air from the compression space into the compressed air supply and storage installation,
(b) connect the compression space to the compressed air supply and storage installation in a compressed air expansion mode to convey compressed air from the compressed air supply and storage installation into the compression space, and
(c) change over between the compressed air generation mode and the compressed air expansion mode based on electrical actuation of at least one electrically actuatable valve of the at least one valve assembly using the at least one electronic control apparatus.

2. The pressure control device as claimed in claim 1, wherein the at least one electrically actuatable valve is one of a piezoelectrically, electromagnetically, electromotively, electropneumatically and electrohydraulically actuatable valve.

3. The pressure control device as claimed in claim 1, wherein the at least one electrically actuatable valve is integrated in at least one of a cylinder head and a crankcase of the compressed air compressor.

4. The pressure control device as claimed in claim 1, wherein the at least one electrically actuatable valve at least one of precedes an inlet connection of the compressed air compressor and follows an outlet connection of the compressed air compressor.

5. The pressure control device as claimed in claim 1, wherein the at least one valve assembly is connected to an additional tap of the compression space of the compressed air compressor.

6. The pressure control device as claimed in claim 1, wherein the compressed air compressor is a multi-cylinder compressed air compressor, and wherein the at least one valve assembly has a connecting valve configured to connect two compression spaces of the multi-cylinder compressed air compressor together when the connecting valve is open in an idling mode.

7. The pressure control device as claimed in claim 1, wherein a volume of the compression space is variable in time, and wherein in the compressed air expansion mode, the compression space is connected to the compressed air supply and storage installation during a part of a volume enlargement phase in which the volume increases over time, and wherein the compression space is connected to atmosphere during a volume reduction phase in which the volume decreases over time.

8. The pressure control device as claimed in claim 7, wherein a connection of the compression space to the compressed air supply and storage installation is established at commencement of the volume enlargement phase.

9. The pressure control device as claimed in claim 7, wherein a connection of the compression space to the compressed air supply and storage installation is made only during half a duration of the volume enlargement phase.

10. The pressure control device as claimed in claim 9, wherein the connection is made only during one eighth of the duration of the volume enlargement phase.

11. The pressure control device as claimed in claim 1, wherein the pressure control device is configured to (i) detect overrun phases when the vehicle is in operation, (ii) operate the compressed air compressor in the compressed air generation mode when an overrun phase is present, (iii) detect phases with an increased drive power demand when the vehicle is in operation, and (iv) operate the compressed air compressor in the compressed air expansion mode when a phase with an increased drive power demand is present.

12. The pressure control device as claimed in claim 1, wherein the at least one electronic control apparatus is configured to receive from an engine control apparatus information on angular position of an output shaft of the at least one engine.

13. The pressure control device as claimed in claim 1, wherein the at least one electronic control apparatus is configured to (i) evaluate over time pressure peaks due to compression action via at least one pressure sensor, (ii) determine as a correcting value an angle difference between an angular position of a crankshaft of the compressed air compressor and an angular position of an output shaft of the vehicle engine, and (iii) use the calculated correcting value for in-phase control of the at least one valve assembly.

14. The pressure control device as claimed in claim 1, further comprising a valve via which a crankcase of the compressed air compressor is acted upon with compressed air from the compressed air supply and storage installation.

15. A vehicle compressed air installation comprising the pressure control device as claimed in claim 1.

16. The vehicle compressed air installation as claimed in claim 15, further comprising a heat exchanger the heat exchanger being thermally coupled to one of the vehicle engine and parts of the vehicle heated by the engine and to parts of the compressed air supply and storage installation to dispense heat absorbed by one of the engine and the parts heated by the engine to the compressed air in the compressed air supply and storage installation.

17. The vehicle compressed air installation as claimed in claim 16, wherein the pressure control device is configured to permit heat to be dispensed to the compressed air supply and storage installation only when the compressed air generation mode is not activated.

18. A compressed air compressor configured to operate with the vehicle compressed air installation as claimed in claim 15.

19. The compressed air compressor as claimed in claim 18, comprising:
   a compression inlet valve; and
   a compression outlet valve.

20. The compressed air compressor as claimed in claim 19, comprising:
   an expansion inlet valve; and
   an expansion outlet valve.

21. The compressed air compressor as claimed in claim 20, wherein the expansion inlet valve and the expansion outlet valve are mechanically crankshaft-controlled valves.

22. The compressed air compressor as claimed in claim 21, comprising:
   a camshaft connected to a crankshaft of the compressed air compressor;
   a first actuating tappet connected between the camshaft and the expansion inlet valve; and
   a second actuating tappet connected between the camshaft and the expansion outlet valve.

23. The compressed air compressor as claimed in claim 22, wherein the first tappet opens the expansion inlet valve in a volume enlargement phase and the second tappet opens the expansion outlet valve in a volume reduction phase.

24. The pressure control device as claimed in claim 1, comprising:
   a first electrically actuatable valve of the at least one electrically actuatable valve configured to fluidly couple the compressed air supply and storage installation to an expansion inlet valve of the compressed air compressor in an open position; and a second electrically actuatable valve of the at least one electrically actuatable valve configured to fluidly couple an expansion outlet valve of the compressed air compressor to the atmosphere in an open position.

25. The pressure control device as claimed in claim 24, wherein the first and second electrically actuatable valves are in the open position during the compressed air expansion mode, and wherein the first and second electrically actuatable valves are in a closed position during the compressed air generation mode.

26. A method for controlling pressure in a vehicle having at least one engine for generating vehicle drive power, a compressed air supply and storage installation and a compressed air compressor coupleable to the engine, the method comprising:
   a) in a compressed air generation mode, conducting compressed air from a compression space of the compressed air compressor into the compressed air supply and storage installation,
   b) in a compressed air expansion mode, conducting compressed air from the compressed air supply and storage installation into the compression space,
   c) changing over between the compressed air generation mode and the compressed air expansion mode as a result of electrical actuation of at least one electrically actuatable valve of at least one valve assembly using an electronic control apparatus, wherein the at least one electrically actuatable valve remains unactuated substantially throughout each mode of the compressed air expansion mode and the compressed air generation mode.

27. The method as claimed in claim 26, wherein the compressed air compressor operates in at least one of (i) the compressed air generation mode during an overrun phase when the vehicle is in operation, and (ii) the compressed air expansion mode in a phase with an increased drive power demand when the vehicle is in operation.

* * * * *